United States Patent [19]

Honji et al.

[11] Patent Number: 4,517,504

[45] Date of Patent: May 14, 1985

[54] APPARATUS FOR SENSING AND MEMORIZING MODEL PROFILE AND FOR CONTROLLING MACHINING OPERATION THEREBY

[75] Inventors: Kunihiko Honji, Ina; Toshiyuki Aoki, Shiojiri, both of Japan

[73] Assignee: Kabushiki Kaisha Sankyo Seiki Seisakusho, Shimosuwa, Japan

[21] Appl. No.: 128,756

[22] Filed: Mar. 10, 1980

[30] Foreign Application Priority Data

Mar. 12, 1979 [JP] Japan ................................. 54-28422

[51] Int. Cl.$^3$ ............................................. G05B 19/42
[52] U.S. Cl. .................................... 318/568; 318/578; 318/646
[58] Field of Search ......................... 318/568, 578, 646

[56] References Cited

U.S. PATENT DOCUMENTS

| | | | |
|---|---|---|---|
| 2,655,630 | 10/1953 | Kelk | 318/578 |
| 2,721,989 | 10/1955 | Gates et al. | 318/568 |
| 3,559,021 | 1/1971 | Bingham, Jr. | 318/568 |
| 3,629,558 | 12/1971 | Coggin | 318/568 |
| 4,064,446 | 12/1977 | Krohn | 318/578 |
| 4,122,634 | 10/1978 | Nishimura et al. | 318/578 |
| 4,157,679 | 6/1979 | Wenzel | 318/578 |

Primary Examiner—J. V. Truhe
Assistant Examiner—Eugene S. Indyk
Attorney, Agent, or Firm—James C. Wray

[57] ABSTRACT

An automatic machining apparatus includes means of sensing or measuring displacements of a work model, manual operation means for manually operating said sensing means, a displacement determining device for measuring the pressure difference responsive to the displacement measured by said sensing means, means for conversion of said pressure difference into electric signals and transmission of said signals, means for memorizing said signals transmitted from the signal transmitting means and storing the information in response to said transmitted signals, including means for computing the positional difference or disagreement between the sensing means and the work model, means for displacing machining means for machining a work piece in accordance with the necessary information provided from the memory stored in the memorizing means, means for slidably, rotatably or withdrawably mounting the sensing means nearby the machining means, means for holding the work model or work piece, means of controlling the holding means, means for machining the work piece including a variable machine tool, and feed means for permitting the machining means to machine the work piece in conformity with the information stored in the memory means in such a way that the sensing means followed the work model by the operation of the operation means.

8 Claims, 11 Drawing Figures

FIG. 6
FIG. 7
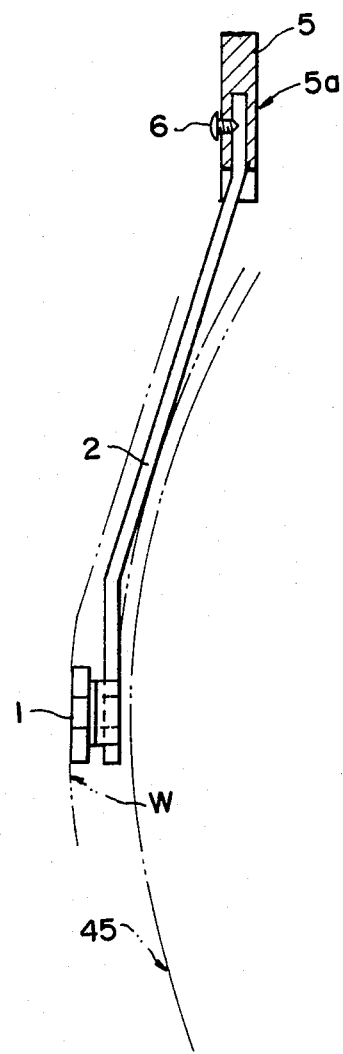
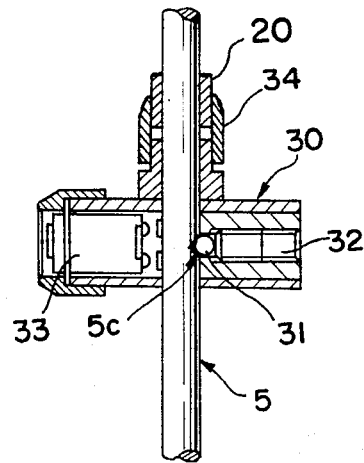

4,517,504

APPARATUS FOR SENSING AND MEMORIZING MODEL PROFILE AND FOR CONTROLLING MACHINING OPERATION THEREBY

BACKGROUND OF THE INVENTION

The present invention relates to an automatic machining apparatus wherein a work piece is machined with a machine tool by displacing the machine tool and the work piece relative to each other along a predetermined region to be machined.

Heretofore, most of conventional automatic machining apparatuses in which a machine tool is displaced along the region to be machined of a work piece stored in advance are operated by means of numerical controls. Accordingly, they have disadvantages that they are of a large size and their operations become so complicated that they undergo troubles.

Conventional profiling apparatuses have similar disadvantages. Furthermore, since they are provided with a sensing device for automatically sensing the machining region of a work piece, faults resulting from the overrun or the like of a sensing part during the sensing operation are prone to occur and they may permit a rectilinear machining in two dimensions only.

SUMMARY OF THE INVENTION

Accordingly, the object of the present invention is to provide an automatic machining apparatus which can automatically machine a work piece at high precision and high quality in accordance with displacements of the corresponding work model.

Another object of the present invention is to provide an automatic machining apparatus which can automatically perform works such as tooling, polishing and grinding by previously storing the profile of a region to be machined by the use of a work model or a machined-tooled reference work piece.

A further object of the present invention is to provide an automatic machining apparatus which includes a displacement sensing device that may sense the three-dimensional displacements of a work model through a manual operation, thereby storing the region and profile to be machined by the use of the work model.

A still further object of the present invention is to provide an automatic machining apparatus which eliminates various disadvantages of conventional machining apparatuses as described above and which undergoes no malfunction as associated with conventional apparatuses.

BRIEF DESCRIPTION OF THE DRAWINGS

FIG. 3 is a perspective view of a pair of strain gauges constituting a bridge.

FIG. 4 is a partial sectional view of a fixing side portion of the displacement determining device of this invention.

FIG. 5 is a partial sectional view showing a state in which a sensing plate is engaged with a circuit box.

FIG. 6 is a front view of an arm.

FIG. 7 is a sectional view of a grip.

DETAILED DESCRIPTION OF THE INVENTION

An automatic machining apparatus according to this invention comprises a displacement determining device which includes displacement sensing means and memory means for storing relative displacements sensed in conformity with a work model, means for holding the work model and a work piece, means for machining the work piece with a machine tool, and feed means for moving the machining means in accordance with the displacements stored by the memory means.

The displacement sensing means which constitutes the displacement determining device according to the present invention comprises a sensor which senses displacements of the work model in abutment with or in a spaced relation to this work model, a sensing member which is freely displaced in three-dimensional directions in correspondence with the displacements, and means for converting into electric signals the displacements sensed by the sensor, the sensing member and a manual operation portion.

Figure 1:
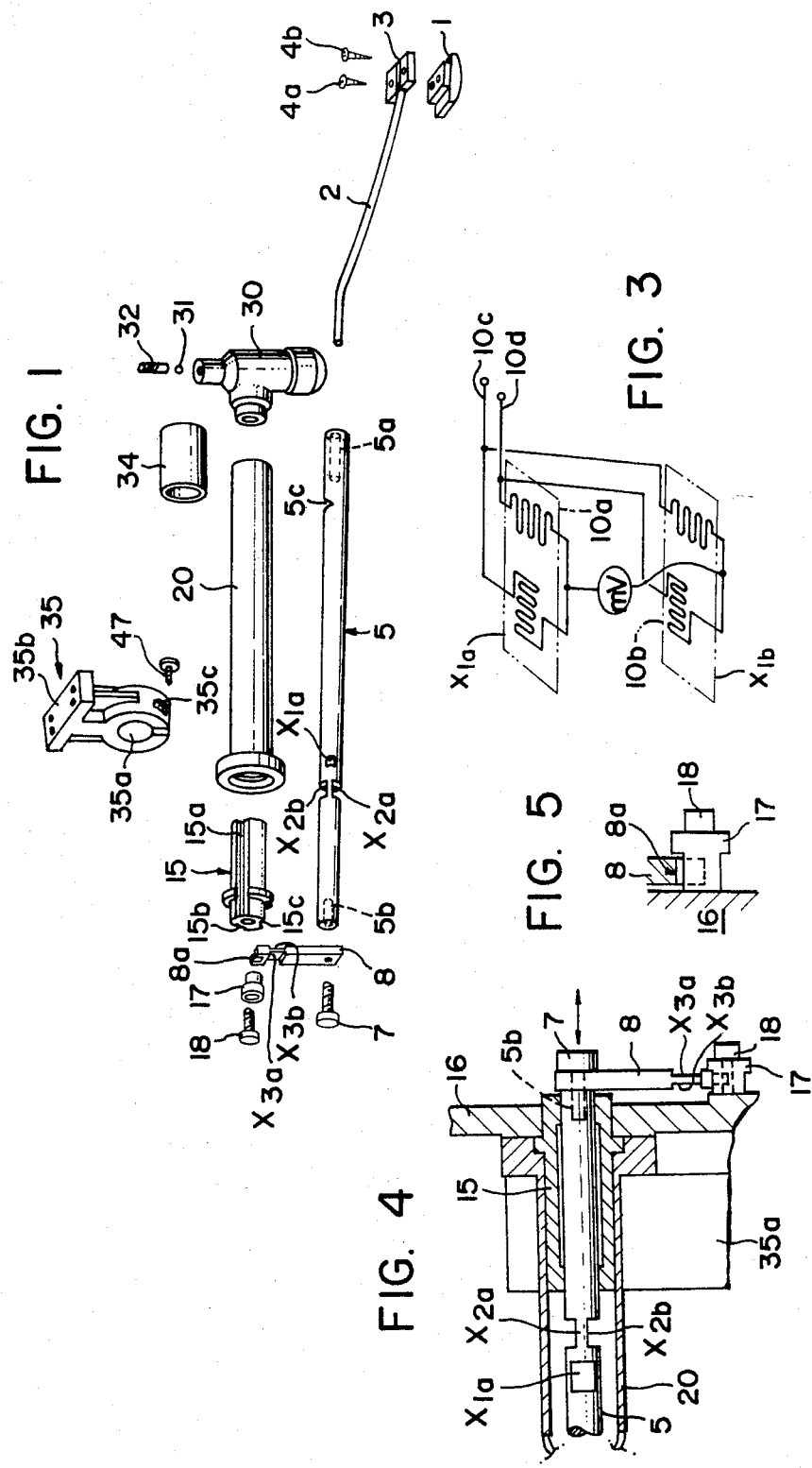
FIG. 1 is an exploded perspective view of a displacement determining device according to this invention.
Figure 2:
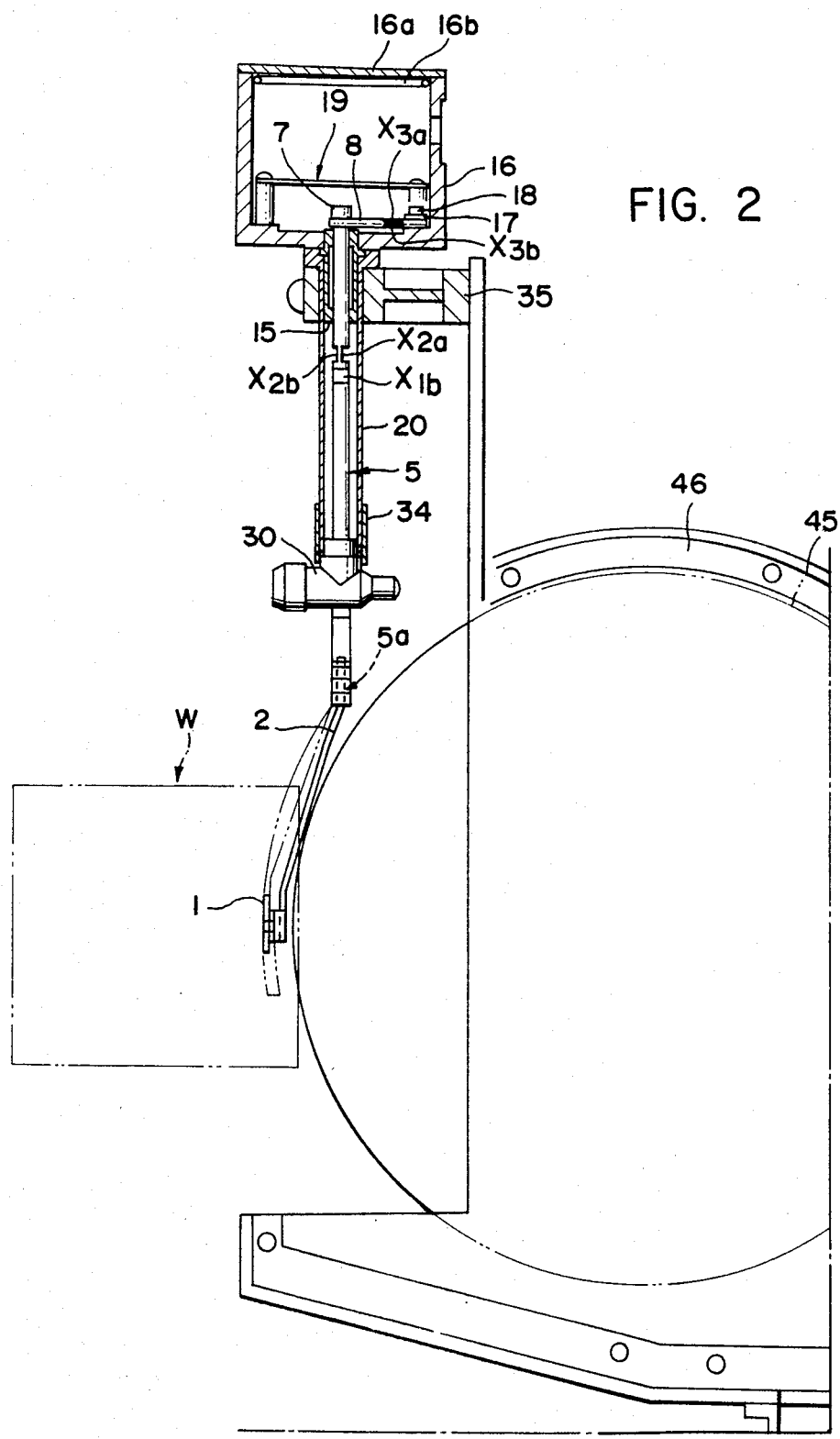
FIG. 2 is a side view, partially in section, showing a state in which the displacement determining device of this invention is attached to a polishing machine.

The arrangements of the sensor, the sensing member and the manual operation portion constituting displacement sensing means according to this invention will be described with reference to FIGS. 1, 2, 6 and 7. In FIGS. 1 and 2, the sensor 1 has a curved sensing face and may smoothly abut on a work model W.

It is to be noted, however, that the sensor is not limited to that of the type disclosed and depicted herein and any other sensor of the type adaptable to the displacement sensing device in accordance with the present invention may be applicable. For example, there may be used a sensor having a nozzle through which air or any other appropriate gas may be blown at a predetermined pressure to the surface of the work model, thereby measuring and determining the displacements of the model and the positional displacements between the top surface of the sensor and the model surface.

A sensor also may be applied of the type having any other mechanism which may detect and determine the surfacial displacements of the work model and the positional displacements between the model and the sensor surface. The sensor 1 is fixed to an end part 3 of an arm 2 by screws $4a$ and $4b$. The other end part of the arm 2 is inserted into an inserting hole $5a$ provided in one end of a rod-like sensing member 5, and is fixed by a screw 6 as shown in FIG. 6.

The peripheral surface of the rod-like sensing member 5 to which the arm 2 is secured is formed with two pairs of cut-away flat portions $X_{1a}$, and $X_{1b}$, and $X_{2a}$ and $X_{2b}$ which have each the shapes substantially identical to each other. The cut-away flat portions $X_{1a}$ and $X_{1b}$ are formed in parallel with each other in positions opposing to each other. The same applies to the cut-away flat portions $X_{2a}$ and $X_{2b}$. The pairs of the flat portions $X_{1a}$, $X_{1b}$ and $X_{2a}$, $X_{2b}$ are formed in a manner to intersect orthogonally to each other. To the other end of the rod-like sensing member 5 is integrally fixed a sensing plate 8 by means of a screw 7. The sensing plate 8 is formed with cut-away flat portions $X_{3a}$ and $X_{3b}$ opposing to each other. The flat portions $X_{3a}$ and $X_{3b}$ extend in directions orthogonal to both the foregoing flat portions $X_{1a}$, $X_{1b}$ and $X_{2a}$, $X_{2b}$.

Strain gauges 10a and 10b are respectively secured to the cut-away flat portions $X_{1a}$ and $X_{1b}$. As illustrated in FIG. 3, the pair of strain gauges 10a and 10b are secured to the flat portions $X_{1a}$ and $X_{1b}$ opposing to each other, in a manner to face in opposite directions and constitute a bridge. The strain gauges may be susceptible and respond to the strain of the respective flat portions $X_{1a}$ and $X_{1b}$, thereby determining an amount of the strain in the form of resistance changes. In FIG. 3, 'mV' indicate a power supply. Likewise, a pair of strain gauges constituting a bridge is secured to each pair of the flat portions $X_{2a}$ and $X_{2b}$, and $X_{3a}$ and $X_{3b}$. Thus, the strain gauges provided securedly on a pair of the cut-away flat portions of the rod-like sensing member may respond to the action or movement of the sensor in the direction orthogonally to the surfacial planes of the flat portions. That is, the strain gauges of the flat portions $X_{1a}$ and $X_{1b}$ can detect a displacement in the X-axial direction, the strain gauges of the flat portions $X_{2a}$ and $X_{2b}$ a displacement in the Y-axial direction, and the strain gauges of the flat portions $X_{3a}$ and $X_{3b}$ a displacement in the Z-axial direction, each referred to so herein. Accordingly, the directions and magnitudes of the three-dimensional displacements of the rod-like sensing member 5 and the sensing plate 8 can be simultaneously determined by detecting the resistance changes of the strain gauges respectively secured to the flat portions $X_{1a}$ and $X_{1b}$, $X_{2a}$ and $X_{2b}$, and $X_{3a}$ and $X_{3b}$.

As illustrated in detail in FIGS. 4 and 5, a bush 15 is slidably fitted on the other end side of the rod-like sensing member 5, and the rod-like sensing member 5 is mounted on one side wall of a circuit box 16 through the bush 15. At this time, the sensing plate 8 is held in such a way that a collar 17 is engaged with a recess 8a formed in an end part of the sensing plate. The collar 17 is fixed to the inner wall surface of the circuit box 16 by means of a bolt 18. On the outer peripheral surface of the bush 15 are formed slots 15a, 15b and 15c, as shown in FIG. 1, through which leads 10c and 10d as illustrated in FIG. 3 of the strain gauges 10a and 10b secured to the flat portions $X_{1a}$, $X_{1b}$ and $X_{2a}$, $X_{2b}$, and leads (not shown) connected to a speed change-over switch 33 disposed within a grip for the manual operation may be passed through the protective cover 20 and along the slots so as to guide the leads to a circuit board 19 within the circuit box 16.

A protective cover 20 is fitted on the outer periphery of the bush 15. By fastening the protective cover 20 to the inner side wall of the circuit box 16 with bolts or the like (not shown), the bush 15 is simultaneously fixed to the circuit box 16. The protective cover 20 serves to prevent dust etc. in open air from adhering to the rod-like sensing member 5. A motor control circuit, a displacement memory circuit etc., which will be described later, are received in the circuit box 16.

The sensing member having such construction is further provided with manual operation means. As shown in detail in FIG. 7, the grip 30 for the manual operation is fitted on a suitable place of the rod-like sensing member 5, usually in a place close to the sensor 1. A ball 31 is fitted in a V-shaped notch 5c formed in the peripheral outer surface of the rod-like sensing member 5. Further, the ball 31 is pressed by a screw 32. As referred to previously, the speed change-over switch 33 is disposed in the grip 30. The switch 33 permits an efficient sensing operation by changing the feed speed of a work model. More specifically, the switch 33 is turned off and a usual machining feed speed is set during the sensing operation, and the work model can be fed fast in the other cases, that is, where the sensor is brought close to the surface of the work model for sensing.

The displacement determining device having the above construction may be attached through suitable means to the body of the automatic machining apparatus which carries out works such as tooling, polishing, trimming and grinding. That is, the displacement determining device in accordance with the present invention has a high versatility and is applicable to various machines of or for a robot arm, tooling, profiling, burring or the like.

After the shape of the work model W and a working portion have been determined the displacement determining device is detached or swiveled lest the operation of the working portion including a machine tool such as a grindstone should be hindered during the machining such as polishing and burring. The displacement determining device is detachably or pivotably installed on the body of the automatic machining apparatus by means a holder 35 or any other appropriate means for installation. The holder 35 is made up of a hollow cylindrical portion 35a, and a mounting portion 35b which can be attached to a suitable place of the apparatus body, for example, a protective cover or an arm for the machine tool. The protective cover 20 of the displacement determining device is fitted in the cylindrical portion 35a, and a screw 47 is engaged with a tapped hole 35c provided in the peripheral wall of the cylindrical portion 35a, whereby the displacement determining device is firmly grasped. After the displacement of the work model has been sensed by the sensing member, the screw 47 may be loosened so as to permit the sensing member provided with the protective cover 20 or the like to slidably move from the original position in order not to hinder the operation of the machining operation. The displacement determining device fixed to the body of the automatic machining apparatus through the mounting portion 35b can be detached after the displacement has been sensed. The mounting means is not restricted to the above-mentioned embodiments at all, but it may be any means which does not impede the operation of the machine tool during the working operation.

The operation of the automatic machining apparatus of this invention will be described by taking an automatic burring apparatus as an example.

Figure 8:
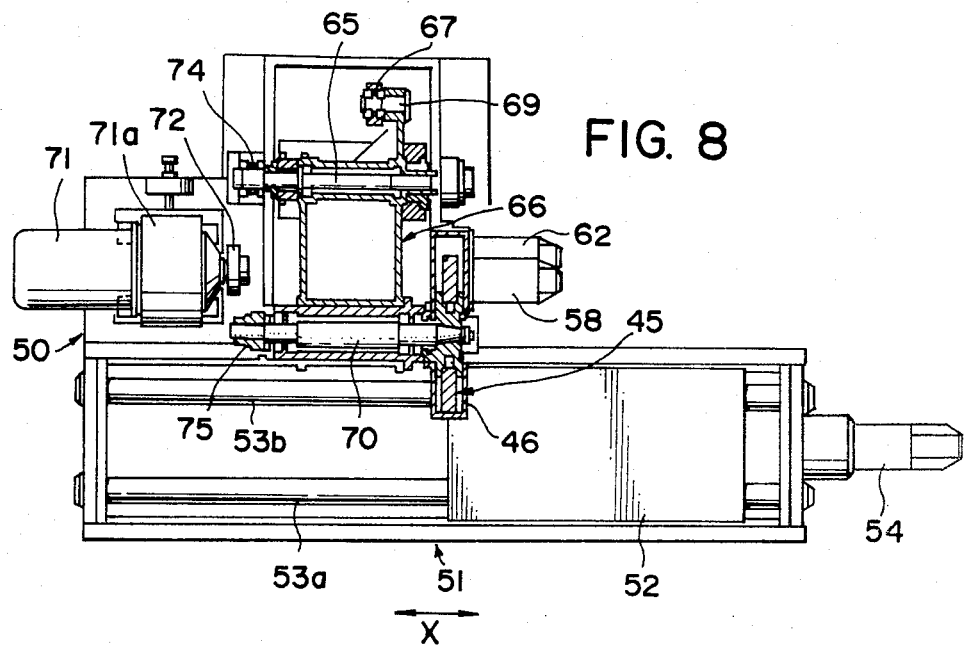
FIGS. 8 and 9 are a plan view and a sectional view of an automatic burring apparatus on which the displacement determining device of this invention can be installed, respectively.
Figure 9:
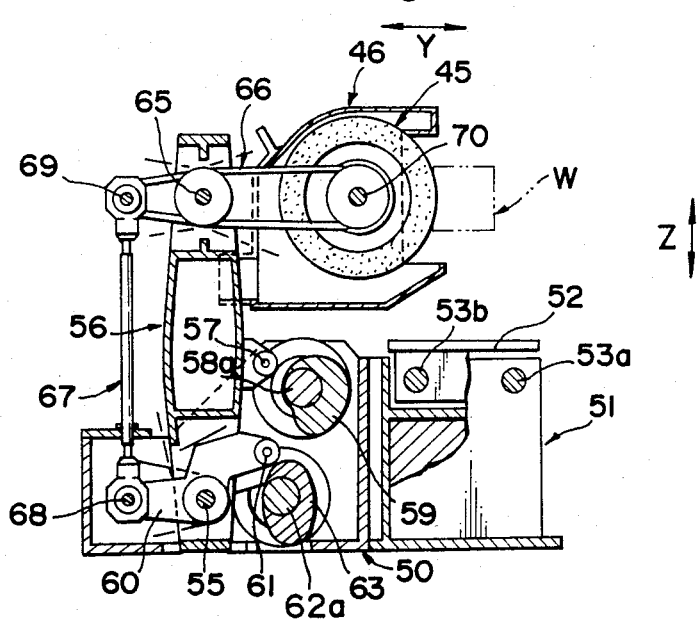
Figure 10:
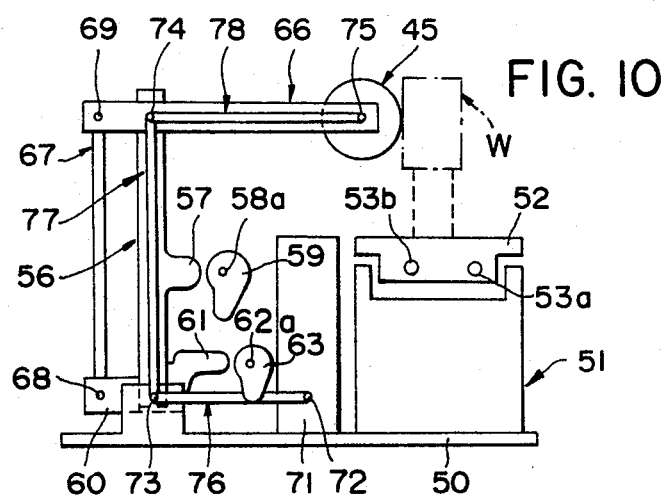
FIG. 10 is a schematic side view illustrating the operating principle of the automatic burring apparatus shown in FIGS. 8 and 9.

Referring now to FIGS. 8, 9 and 10, a work piece W may be clamped by means of a conventional clamping device (not shown) for holding the work piece during the machining operation and the corresponding work model during the sensing operation. There may be used work-piece holding means suitable for respective machining apparatuses, for example, a slide table or a turntable. In one embodiment of the present invention, the work model and the work piece W are fixed by the conventional clamping device (not shown) mounted on a clamp table 52 which is slidably mounted on the slide table device 51, fixed on a base 50, by means of supporting rods 53a and 53b, thereby allowing the work piece to move concurrently with the slide table. The moving direction of the clamp table 52 is supposed to be the X-axial direction. The clamp table 52 is reciprocated in the X-axial direction by a servo D.C. motor 54 which is installed on the slide table divice 51.

On the other hand, a cam follower 56 is installed on the base 50 in a manner to be rotatable by means of a shaft 55. A sliding contact roller 57 is mounted on the cam follower 56 and lies in a position in which it is engageable with a cam 59 mounted on a rotary shaft 58a of a servo D.C. motor 58 fixed on the base 50. As the cam 59 turns forwards and reversely, the cam follower 56 oscillates about the shaft 55.

Further, a cam follower 60 is also rotatably mounted on the shaft 55 and a sliding contact roller 61 is mounted on one end of the cam follower 60. The sliding contact roller 61 lies in a position in which it is engageable with a cam 63 which is mounted on a rotary shaft 62a of a servo D.C. motor 62 fixed on the base 50. The cam follower 60 oscillates about the shaft 55 through the forward and reverse turning of the cam 63.

An arm 66 is disposed above the cam follower 56 and supported by a shaft 65 in a manner to freely oscillate. One end of the arm 66 and one end of the cam follower 60 are coupled by a rod 67 at pivots 68, 69 for coupling. The length of the rod 67 is adjustable.

A grindstone 45 is installed on the other end of the arm 66 and supported rotatably by a shaft 70. It is to be noted that means for machining a work piece should not be construed as limited to such a grindstone as described herein and to be understood that any machine tool adaptable to the apparatus of the present invention may be used for the purposes described herein. The machining means may be encompassed with a protective cover 46 which is secured integrally with the arm 66, thereby preventing dust from scattering. The displacement determining device in accordance with this invention may be installed on the protective cover 46. The place of the installation, however, is not restricted to the protective cover 46 but may well be any other appropriate position such as the arm 66 as long as the installation of the device does not hinder the operation of the apparatus.

A rotating drive system for the grindstone 45 in the embodiment of the present invention may be arranged in the following scheme. As may be best seen in FIG. 10, the grindstone 45 may be rotated by transmitting the rotating force of a servo D.C. motor 71 through a plurality of belts or by means of any other appropriate means for rotating the grindstone or any other machining tool of the type adaptable to the apparatus of the present invention. A pulley 72 is mounted on a rotary shaft of a stepless transmission 71a attached to the servo D.C. motor 71 fixed on the base 50. A belt 76 is arranged to extend and travel between the pulley 72 and a pulley 73 mounted on the shaft 55 of the cam follower 60. The shaft 65 supporting the arm 66 disposed above the cam follower 56 is mounted with a pulley 74, and another belt 77 is extended to travel between the pulley 73 and 74. The pulleys 73 and 74 are rotatably mounted relative to the corresponding shafts 55 and 65. The shaft 70 supporting the grindstone 45 is mounted with a pulley 78 which is unitary with the shaft 70. With this arrangement, the rotary force produced by the rotation of the servo D.C. motor 71 may be transmitted from the pulley 72 through the pulleys 73 and 74 by means of the respective belts 76, 77, and 78 to the pulley 75, whereby the grindstone 45 is rotated to machine the work piece W.

As have been explained hereinabove, the belt means is divided into a plurality of belts and the relative distances between the respectively adjacent pulleys are arranged to be kept constant. Thus, even when the cam follower 56 and the arm 66 oscillate to displace the grindstone 45 respectively, the turning force of the motor 71 is reliably transmitted to the grindstone 45. In the arrangement of the means for transmitting the turning force of the motor, the machining tool also may be advantageously driven by means of a stationary motor.

Furthermore, each of the rotating speeds of the servo D.C. motors 58, 62 and 71 may be changed over between two speeds. Using the fast feed the grindstone 45 is brought near to the work piece W, whereupon the rotating speed is changed over to the slow feed which may serve as the machining feed. Thus, a period for machining may be shortened.

The operation of the displacement determining device to be used in accordance with the present invention will be illustrated. The sensor 1 of the rod-like sensing member 5 is moved along the surface of a work model W while manipulating the switch 33 in the grip section 30 provided in the sensing member of the displacement determining device. The device also may be operated in a manner such that the switch 33 is manipulated to bring the sensor close to the work model surface at a speed faster than the machining speed and then changed over to cause the sensor to travel in abutment with or in a spaced relation to the work model. The sensing member may be arranged to sense displacements in rotational directions or in three-dimensional directions. The displacements of the work model surface which were sensed by means of the sensor are then sensed by the pairs of the strain gauges fixed on the respective pairs of the cut-away flat portions provided on the rod-like sensing member and the sensing plate. The pair of the strain gauges can sense in response to the movement of the sensor in a direction orthogonal to the surfacial plane of the respective pair of the cut-away flat portions in the sensing member as variations in stresses between the pair of the cut-away flat portions. As three of pairs of the cut-away flat portions are provided in the sensing member, the sensing device may sense displacements in three dimensions.

For example, when a pair of the cut-away flat portions $X_{1a}$, $X_{1b}$ are stressed in accordance with the displacements of the work model surface by the sensor, the electric resistances of the respective strain gauges increase or decrease in response to the magnitudes of the stresses. Likewise, the pairs of the cut-away flat portions $X_{2a}$, $X_{2b}$ and $X_{3a}$, $X_{3b}$ can respond to the stresses in the respective directions, thereby determining the respective displacements of the work model. Thus, the directions and magnitudes of displacements of the sensor may be detected in the three dimensions of the X-axis, Y-axis and Z-axis independently of one another by means of the strain gauges. It is accordingly needless to say that this device can detect displacements in one or two directions only. In the foregoing embodiment, the strain gauges are used as a pair as high outputs of the strain gauges may be achieved; however, it is not restricted to this particular embodiment and one strain gauge on each pair of the cut-away flat portions may be utilized.

The directions and magnitudes of the displacements of the sensor 1 may be stored in a memory device as a function of time. In the memory device is also provided an operating function for determining and compensating for the positional difference or disagreement between the surfacial displacements of the work model W measured directly or indirectly by means of the sensor 1 and the work piece to be actually machined because the sensor 1 and the machining tool 45 are placed in juxtaposition with or in spaced apart relation to each other. With this function provided in the memory device, the exact information can be issued to the machining means. The machining means such as the rotary grindstone 45 or the work piece W may be three-dimensionally displaced by control signals coming from the memory device and then the machining means automatically machines the work piece in accordance with the exact information memorized in the memory device.

Figure 11:
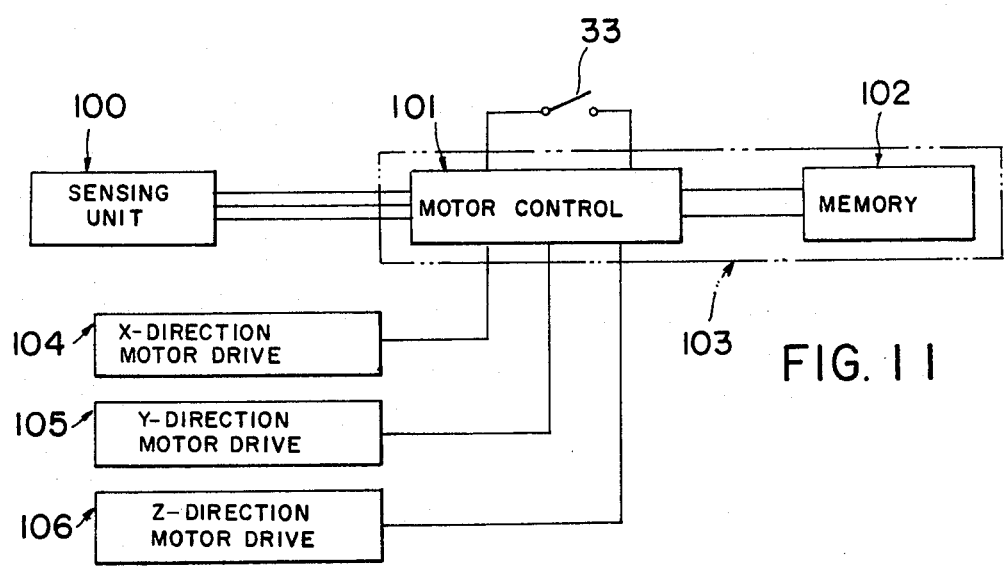
FIG. 11 is a control block diagram.

An example of the circuit block is shown in FIG. 11 in which reference numeral 100 indicates a sensing unit consisting of the sensor 1, the rod-like sensing member 5, three pairs of the strain gauges, the power supply mV, the circuit box 16 and the like, the sensing unit 100 being fixed through the holder 35 to the body of the automatic machining apparatus according to the present invention, as shown in FIG. 5. Reference numeral 101 indicates a motor control circuit and 102 a memory circuit, and these circuits 101 and 102 constitute a micro-computer 103. The motor control circuit 101 controls an X-direction motor drive circuit 104 for displacement in the X-axial direction, a Y-direction motor drive circuit 105 for displacement in the Y-axial direction, and a Z-direction motor drive circuit 106 for displacement in the Z-axial direction. Thus, the rotary grindstone 45 may be moved and displaced in the three-dimensional directions relative to the work piece W in accordance with the memory of the memory circuit 102, whereby the machining can be achieved.

Now, the whole operation of the apparatus in accordance with the present invention will be described particularly with reference to FIG. 10. The work model W is first set on the clamp table 52, and the displacement determining device is manually operated so as to follow the shape of the model. The manual operation is executed by appropriately rotating the motors 54, 58 and 62 forwards and reversely. The movements of the sensor 1 are stored in the memory circuit 102.

Thus, the positional relations between the grindstone 45 and the work piece W are stored in the memory circuit 102 in advance. Therefore, when the motors 54, 58 and 62 are rotated forwards and reversely in accordance with the memory, the work piece W subsequently clamped can have its burr removed automatically. More specifically, the work piece W is moved in the X-axial direction by the rotation of the motor 54, the grindstone 45 is moved in the Y-axial direction by the rotation of the motor 58, and the grindstone 45 is moved in the Z-axial direction by the rotation of the motor 62. By controlling the rotations of the motors 54, 58 and 62, the grindstone 45 is moved as per the information stored in the memory circuit 102 and removes the burr.

Since the grindstone 45 wears away with the use, its peripheral speed changes to render an adequate burr removal impossible. As a countermeasure, the rotating speed of the motor 71 may be automatically corrected in dependence on the period of time of the rotation of the grindstone 45. Alternatively, a stepless transmission 71a may be disposed between the motor 71 and the pulley 72, the pulley ratio being altered by manually operating the motor 71.

In some shapes of the work piece W, it is also possible in the burr removing work that the tool is intentionally caused to overrun the work piece with an unworked part left behind, whereupon it is retreated so as to remove the burr.

In the foregoing embodiment, although the work piece is moved rectilinearly, it may be turningly moved as well. The driving source is not restricted to the servo D.C. motors. Furthermore, the traveling path of the grindstone is desirably directed from the highest level or a higher level towards a lower level with respect to the work piece. Of course, however, the present invention is not restricted to this aspect.

In the case where burrs of a work piece are deep, it is preferred that the work piece are burred little by little by repeating the machining operations of a machine tool. In this case, it is preferred that the shape of the corresponding work model is sensed such that the sensor is brought close to the model and then withdrawn from the position. This operation is repeated and eventually the sensor is brought into abutment with the model surface.

As set forth above, the shape of a work piece in a required region may be manually detected and stored so that the storage of a local region alone is also possible. Accordingly an efficient machining, such as automatic burr removal, of the work piece can be achieved.

Modifications of the foregoing embodiment also may be effected, for example, by detaching accessories attached to the machining means and then installing the manual operation section. In the feed of the work piece, the motor also may be replaced with a cam and a cylinder. Furthermore, during the machining, the sensing unit 100 may be turned aside withdrawably.

As have been described above, the automatic machining apparatus of the present invention can achieve a high precision detection and carry out the high-precision machining very easily in three dimensions. The construction of the apparatus is simple and the whole equipment may become small in size. The apparatus of the present invention can prevent dust from scattering by sealing the sensing unit portion so that reliability is enhanced. Furthermore, since the feed speed change-over switch is disposed in the grip for the manual operation, the change over between the fast feed and the slower machining feed can be achieved to permit an efficient sensing operation.

What is claimed is:
1. Automatic machining apparatus comprising
    an arm having a machine tool mounted at a tip thereof,
    motor means for driving said arm,
    a table for mounting and clamping a work model or a work piece to be machined,
    motor means for driving said table,
    object-contour sensing means for sensing the contour of the work model, said object-contour sensing means being attached to the tip of said arm side-by-side with said machine tool and being detachable or retractable so as not to interrupt operation of the machine tool during machining,
    means for manually moving said object-contour sensing means along the contour of the work model in three dimensions, said manually moving means actuating said table driving motor means and said arm driving motor means to sense the contour of the work model, the object-contour sensing means being in abutment with or spaced a predetermined distance from the work model, and
    means for memorizing the movements of said table and said arm, and means for actuating the table driving motor means and the arm driving motor means to move the machine tool in three dimensions relative to the work piece in accordance with the memorized movements, and means for driving the machine tool to effect machining of the work piece.

2. The automatic machining apparatus according to claim 1 wherein a strain gauge is provided to sense the movement of said object-contour sensing means.

3. The automatic machining apparatus according to claim 1 wherein said memorizing means includes means for correction of the position difference between said object-contour sensing means and said machine tool.

4. The automatic machining apparatus according to claim 1 wherein said machine tool is rotated by stationary motor means whose rotating force is transmitted therefrom to the machine tool through a plurality of belt means.

5. The automatic machining apparatus according to claim 1, wherein said table is rotatable.

6. The automatic machining apparatus according to claim 1 wherein said machine tool is rotatably or oscillatably mounted on said arm and said table is slidable.

7. The automatic machining apparatus according to claim 1, wherein said machine tool comprises a grindstone which removes burrs from the work piece.

8. The automatic machining apparatus according to claim 1, wherein said object-contour sensing means includes an arm-like sensing member provided with two pairs of cut-away flat portions in directions orthogonal to each other and a sensing plate provided with a pair of cut-away flat portions in the direction orthogonal to said two pairs of the flat portions, said cut-away flat portions being responsive to the stress produced by movement of said object-contour sensing means along the work model and being each provided with a strain gauge, the drive motors driving the machine tool or the work piece independently in the respective direction in accordance with the output signals from the respective strain gauge.

* * * * *